United States Patent
Xu et al.

(10) Patent No.: US 12,376,177 B2
(45) Date of Patent: Jul. 29, 2025

(54) METHOD AND APPARATUS TO DETECT IMS MISSING CALL AND RECOVERY

(71) Applicant: INNOPEAK TECHNOLOGY, INC., Palo Alto, CA (US)

(72) Inventors: Xin Xu, Palo Alto, CA (US); Jaehyeuk Yang, Palo Alto, CA (US); Yongsheng Shi, Palo Alto, CA (US)

(73) Assignee: INNOPEAK TECHNOLOGY, INC., Palo Alto, CA (US)

( * ) Notice: Subject to any disclaimer, the term of this patent is extended or adjusted under 35 U.S.C. 154(b) by 0 days.

(21) Appl. No.: 18/449,669

(22) Filed: Aug. 14, 2023

(65) Prior Publication Data
US 2023/0389107 A1 Nov. 30, 2023

Related U.S. Application Data

(63) Continuation of application No. PCT/US2022/016811, filed on Feb. 17, 2022.
(Continued)

(51) Int. Cl.
*H04W 76/19* (2018.01)
*H04L 65/1016* (2022.01)
(Continued)

(52) U.S. Cl.
CPC ......... *H04W 76/19* (2018.02); *H04L 65/1016* (2013.01); *H04L 65/1073* (2013.01); *H04L 65/1096* (2013.01)

(58) Field of Classification Search
None
See application file for complete search history.

(56) References Cited

U.S. PATENT DOCUMENTS 6,215,765 B1 * 4/2001 McAllister ......... H04Q 11/0478 370/237
6,631,270 B1 10/2003 Dolan
(Continued)

FOREIGN PATENT DOCUMENTS

CN 101188641 5/2008

OTHER PUBLICATIONS

WIPO, International Search Report and Written Opinion for PCT/US2022/016811, Jun. 2, 2022.

*Primary Examiner* — William G Trost, IV
*Assistant Examiner* — Christopher P Cadorna
(74) *Attorney, Agent, or Firm* — Hodgson Russ LLP

(57) ABSTRACT

A user equipment (UE), a method and a communication apparatus are provided. The UE includes a first communication circuit that receives a notification, a processor, and a memory unit that is operatively connected to the processor and includes instructions. The instructions, when being executed, cause the processor to execute a method. In the method, it is determined that the notification indicates that an incoming call was directed to the UE during a preset time period. It is identified that the UE did not receive the incoming call during the preset time period based on: an identification that the incoming call was not forwarded to another device; and an identification that, during the preset time period, the UE was not in a call handling mode in which the UE does not receive incoming call. A recovery option is performed based on identification that the UE did not receive the incoming call.

5 Claims, 6 Drawing Sheets

Related U.S. Application Data

(60) Provisional application No. 63/151,268, filed on Feb. 19, 2021.

(51) Int. Cl.
*H04L 65/1073* (2022.01)
*H04L 65/1096* (2022.01)

(56) References Cited

U.S. PATENT DOCUMENTS

| | | | | |
|---|---|---|---|---|
| 2007/0243858 | A1* | 10/2007 | Marathe | H04M 7/0033 |
| | | | | 455/412.2 |
| 2008/0227451 | A1* | 9/2008 | Fukui | H04L 67/1036 |
| | | | | 455/435.1 |
| 2013/0142120 | A1* | 6/2013 | Nishida | H04L 65/1016 |
| | | | | 370/328 |
| 2014/0295807 | A1* | 10/2014 | Li | H04M 3/42195 |
| | | | | 455/414.1 |
| 2015/0124588 | A1 | 5/2015 | Hallenstål et al. | |
| 2016/0353344 | A1* | 12/2016 | Deivasigamani | H04W 4/24 |
| 2018/0248920 | A1 | 8/2018 | Nomani et al. | |
| 2018/0352080 | A1* | 12/2018 | Chong | H04W 8/18 |
| 2020/0153874 | A1 | 5/2020 | Christopher et al. | |
| 2020/0228578 | A1 | 7/2020 | Jia | |

\* cited by examiner

METHOD AND APPARATUS TO DETECT IMS MISSING CALL AND RECOVERY

CROSS-REFERENCE TO RELATED APPLICATION

This application is a continuation of International Application No. PCT/US2022/016811, filed Feb. 17, 2022, which claims priority to U.S. Provisional Application No. 63/151,268 filed Feb. 19, 2021, the entire disclosures of which are incorporated herein by reference.

TECHNICAL FIELD

The present application relates generally to communication networks that facilitate electronic communications between electronic devices and, and in particular, to a method and apparatus for identifying and rectifying connectivity issues between electronic devices.

SUMMARY

In view of the above, the present disclosure proposes a user equipment, a computer implemented method and a communication apparatus.

In a first aspect, an embodiment of the present disclosure provides a user equipment (UE). The UE includes a first communication circuit configured to receive a notification, a processor and a memory unit. The memory unit is operatively connected to the processor, and includes instructions. The instructions, when being executed, cause the processor to determine that the notification indicates that an incoming call was directed to the UE during a preset time period. The instructions, when being executed, cause the processor further to identify that the UE did not receive the incoming call during the preset time period based on at least one of: an identification that the incoming call was not forwarded to another device; and an identification that, during the preset time period, the UE was not in a call handling mode in which the UE does not receive incoming call. The instructions, when being executed, cause the processor further to perform a recovery option based on identification that the UE did not receive the incoming call.

In a second aspect, an embodiment of the present disclosure provides a computer implemented method. In the method, a notification is received at a UE via a first communication circuit. It is determined that the notification indicates that an incoming call was directed to the UE during a preset time period. It is identified that the UE did not receive the incoming call during the preset time period, based on at least one of: the incoming call was not forwarded to another device is identified; and during the preset time period, the UE was not in a call handling mode in which the UE does not receive incoming calls. A recovery option is performed based on identifying that the UE did not receive the incoming call.

In a third aspect, an embodiment of the present disclosure provides a communication apparatus. The apparatus includes a processor and a memory unit. The memory unit is operatively connected to the processor and includes instructions. The instructions, when being executed, cause the processor to: in response to receipt of a notification, by a UE, that a voicemail message for the UE was received within a given time period, determine that the UE was in a mode to receive incoming calls at a time during which the notification was received. It is determined that the notification indicates that the UE did not receive an incoming call within a preset time of receiving the notification. The instructions, when being executed, cause the processor further to perform one or more recovery options without user input based on a determination that the incoming call was missed by the UE.

Other features and aspects of the disclosed features will become apparent from the following detailed description, taken in conjunction with the accompanying drawings, which illustrate, by way of example, the features in accordance with embodiments of the disclosure. The summary is not intended to limit the scope of any embodiments described herein.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
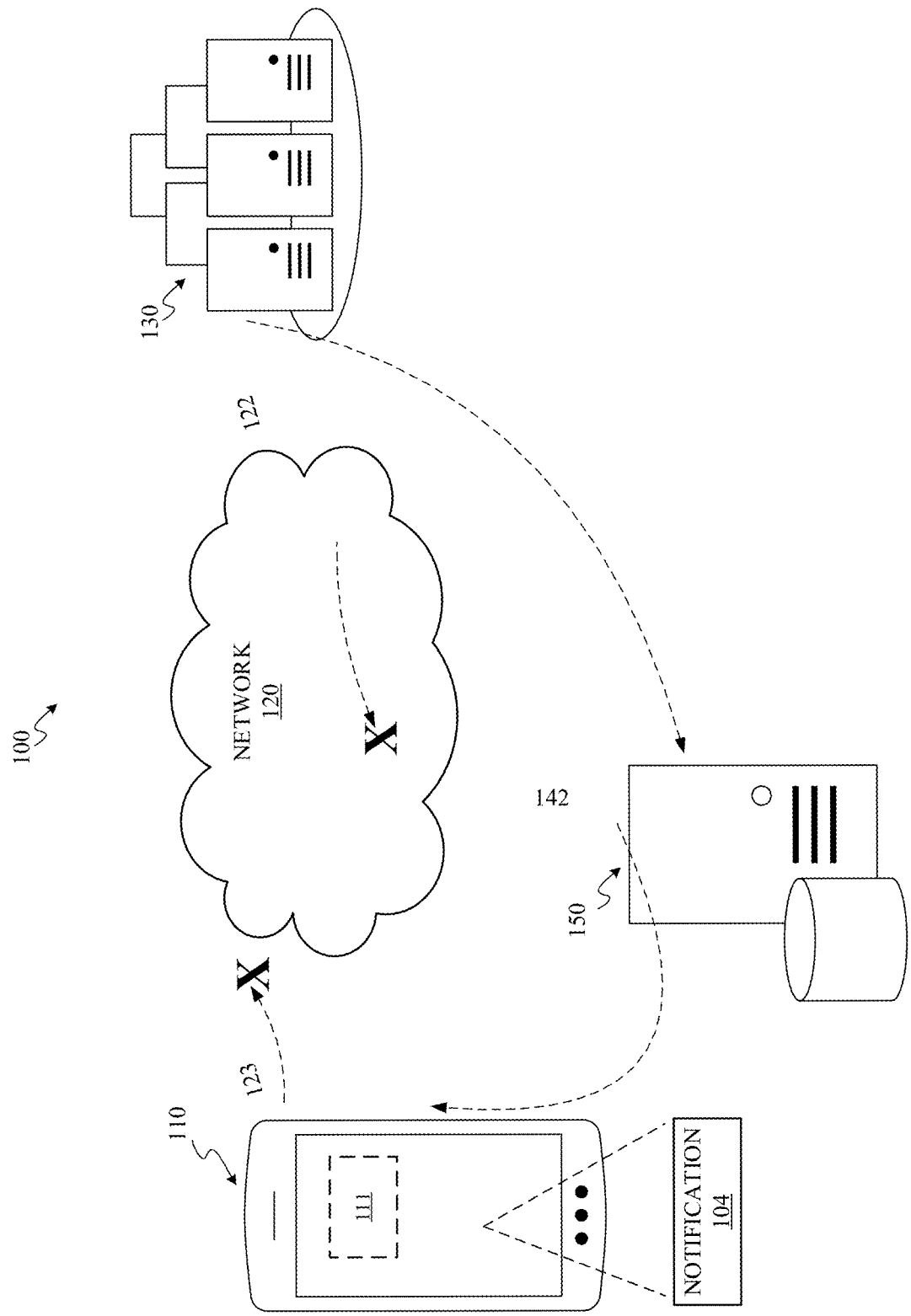
FIG. 1 depicts an example computing system configured to communicate over a communications network and identify and rectify connectivity issues with one or more aspects of the communications network, in accordance with embodiments of the application.

The figures are not exhaustive and do not limit the present disclosure to the precise form disclosed. These illustrative embodiments are mentioned not to limit or define the disclosure, but to provide examples to aid understanding thereof. Additional embodiments are discussed in the Detailed Description, and further description is provided there.

DETAILED DESCRIPTION

Various wireless technology standards enable communications between connected electronic devices. 802.11-based wireless communications (Wi-Fi), third-generation wireless (3G), fourth-generation wireless (4G), Long Term Evolution (LTE), and fifth-generation wireless (5G) are examples of existing radio access technologies (RATs) that have corresponding standards that dictate how communications are performed therewith. These RATs, as well as newly developed RATs and standards, support Internet Protocol (IP) Multimedia Subsystem (IMS) and/or Short Message Service (SMS) communications between corresponding devices. Altogether, these technologies provide connectivity to most current and future cellular or wireless devices.

In some deployments of any RAT, voice calls and communications employ IMS signaling and/or media. Voice and video communications services in the RATs can be implemented on top of IP data connections such that the IMS provides the services for the corresponding RATs. In other words, the IMS provides voice communications as an application service. For example, in 5G New Radio (5G NR), voice calls may be supported entirely over a packet switched (PS) domain with the IMS signaling and/or media, for example, implemented as end-to-end voice over IP (VoIP) connections managed by the IMS.

To enable such connections between user equipment (UEs), the IMS may register the UEs with the IMS and maintain synchronization between the UEs and the IMS. In some embodiments, the registration and synchronization also exist between the UEs and a network over which the IMS provides the voice, video, and similar communications. Therefore, the IMS can play an important role in enabling various existing communication systems.

In some instances, whether or not the UE is registered and synchronized with the IMS controls whether calls between the UE and the IMS terminate appropriately or are completed. For example, with respect to outgoing calls, if the UE is not registered or loses synchronization with the IMS, an outgoing voice call may fail or be rejected by the UE because the UE cannot initiate the call with the IMS over the network. With respect to incoming calls, if the UE is not registered or loses synchronization with the IMS, incoming calls directed to the UE cannot be conveyed to the UE, so such incoming calls also fail.

In the case of the outgoing calls, the UE may present the user with a notification or other warning that the outgoing call could not be completed, for example, because the UE is not registered or synchronized with the IMS. Thus, the user of the UE may receive notification of connection issues between the UE and the IMS, and remedial action(s) may be taken to cure the failed call as soon as the connection issue is identified by the UE and communicated to the user. However, for the incoming voice calls, because the IMS is unable to communicate with the UE, the UE is not even aware of missed calls caused by the loss of registration or synchronization with the IMS. Thus, the UE cannot present the user with any indication of a connectivity issue causing the missed incoming call and no remedial actions are taken to rectify the issue. Often, the UE will continue to miss incoming calls until the user attempts an outgoing call, at which point the UE identifies and notifies the user of a connectivity issue with the IMS. As such, the UE and the user may be unaware of such connectivity issues with the IMS for long periods, which can frustrate use of the UE and corresponding subscribed communication services.

Embodiments of the technology disclosed herein provide distinct methods, apparatus, and systems for improving the overall experience for users who experience lost IMS synchronization between the UE and the IMS. Particularly, the disclosed techniques enable identification and, thus, resolution, of connectivity issues that result in missed incoming voice calls based on receipt of other notifications that can tangentially or relatedly indicate a missed voice call, e.g., voicemail notifications. For example, when the UE receives a notification that a voicemail is available for review but the UE did not register an incoming call that could have led to the voicemail, the UE determines that there may be a connectivity issue between the UE and the IMS. Thereafter, the disclosed embodiments may enable the UE to automatically take corrective action to re-establish IMS registration and synchronization without having to wait for the user to discover the issue (or wait for the user to be notified), and take manual corrective actions. Thus, the disclosed embodiments may avert missed calls and unnecessary communication delays and improve reliability associated with voice calls across various RAT networks, thereby enhancing the user's experience with corresponding mobile networks.

The following acronyms and terms are used throughout the descriptions and are provided below for convenience, although other acronyms and terms may be introduced.
IMS: IP Multimedia Subsystem
RAT: Radio Access Technology
NR: New Radio
SA: Stand-Alone
VoNR: Voice Over NR
VoLTE: Voice Over LTE
VoWiFi: Voice Over WiFi
UE: User Device
MT: Mobile Terminated
MO: Mobile Originated
SMS: Short Message Service (Text)

In the field, several instances have been observed where users using UEs experience connectivity issues during which the UEs are unable to receive voice calls over a period of time when the UEs establish connections with the IMS network over a radio access technology (RAT). Such connectivity issues may occur when the UE and the IMS lose synchronization for various reasons, when UE registration with the IMS fails or lapses, or the like. In many instances, the UE may not be aware of the connectivity issue because, from the perspective of the UE, the UE is properly registered with the IMS to make and receive voice calls. However, the UE may not actually be registered with the IMS on the IMS side to make or receive voice calls. Thus, in the example of an originating UE initiating a call to a terminating UE, where the terminating UE is experiencing a connectivity issue with the IMS, the IMS may not send the appropriate signals and/or messages, such as an IMS session initiation protocol (SIP) to the terminating UE. Instead, the call from the originating UE may go directly to the terminating UE voicemail. In such instances, the terminating UE would not receive any notice of an incoming call, so the terminating UE would not indicate (to its user) a missed call.

Because the connectivity issues between the terminating UE and the IMS network can occur randomly, the issues can be difficult to detect, debug, and correct. As such, these issues can diminish the user's experience because the user is unable to receive any incoming calls until the user identifies the issue and takes corrective action. An automated solution to detect the connectivity issue and try to recover from the connectivity issue is provided with more detail with reference to FIGS. 1-5 below.

FIG. 1 depicts a block diagram of an example computing system 100 configured to enable a user equipment (UE) 110 to send and receive voice communications over a network 120 with an IMS 130 and employ the disclosed techniques to improve voice connectivity with the IMS 130. As shown, the network 120 connects the IMS 130 to one or more UEs, such as the UE 110 and enables communication between the UE 110, the IMS 130, and a voicemail server 150.

The network 120 can be described as the part of the radio access network (RAN) deployment that provides voice, data, and/or messaging services to mobile subscribers, such as the user of the UE 110. The network 120 can also serve as a gateway to other networks, such as the public switched telephone network, public cloud, and the IMS 130. In the example, the networks 120 connects to the IMS 130 that supports voice services.

The IMS 130 may comprise a standardized architectural framework for delivering internet protocol (IP) multimedia services. Furthermore, the IMS 130 may provide connection management for voice services across the various technology standards described herein. The IMS 130 may utilize IP-based Session Initiation Protocol (SIP), which can enable support of voice services over an IP packet-switched, or similar, network.

The voicemail server 150 may comprise any computing system that stores voicemail messages in association with a user account. The voicemail server 150 may be configured to generate and communicate one or more notifications to the user to indicate when a new voicemail is available for the user's review. In some embodiments, the voicemail server 150 generates the notifications as SMS messages or uses similar, non-IMS signaling for communication via the network 120.

In the example of FIG. 1, the UE 110 is shown as a handheld user device, and more specifically a smartphone. However, the UE 110 may be implemented as various other wireless devices that are used directly by an end-user to communicate and equipped with telecommunication functions, such as voice, video, and text. For example, the UE 110 may also be implemented as a cellular telephone, a laptop computer equipped with a mobile broadband adapter, or another mobile computing device. Accordingly, the UE 110 may be capable of supporting enhanced data services, voice (e.g., voice calls over 5G NP, VoNP, VoLTE, etc.), video, and other telecommunication functions that are commonly employed by subscribers to broadband cellular networks, such as the network 120.

As previously alluded to, various technology deployments can provide connectivity between the UE 110 and the IMS 130 via the network 120, such 2G/3G, 4G, 4G LTE, 5G, Wi-Fi and similar technologies. For example, the UE 110 may be used by a user to make voice calls via the network 120 and the IMS 130. Thus, the UE 110 may comprise hardware, software applications, and the like, which allows the UE 110 to be configured for multimedia telephone services including audio, video, and text, and voice calls via any of these technologies.

The UE 110 can include an operating system that provides an interface between hardware (e.g., the input/output mechanisms and a processor executing instructions retrieved from a computer-readable medium) and software components of the UE 110. Example operating systems include ANDROID™, CHROME™, IOS®, MACOS® X, WINDOWS® 7, WINDOWS® PHONE 7, SYMBIAN®, BLACKBERRY®, WEBOS®—a variety of UNIX® operating systems; or a proprietary operating system for computerized devices. The operating system may provide a platform for the execution of application programs that facilitate interaction between the UE 110 and the user.

The UE 110 also may include applications, computing sub-systems, and hardware. For example, the UE 110 includes a connectivity handler 111 configured to implement the disclosed techniques for improving the user experience for users of the UE 110 over one or more voice networks, as described in greater detail herein. The connectivity handler 111 can be implemented on the UE 110 as hardware, a stand-alone processor, firmware, a software application, or any combination thereof.

In accordance with some embodiments, the UE 110 can use the connectivity handler 111 to identify and remedy connectivity issues between the UE 110 and the IMS 130, as described in more detail below. This can help prevent negative impacts, such as delayed notifications, missed calls, and failed calls, for the user using the UE 110.

In operation, the user can use the UE 110 to make or receive calls. For example, the UE 110 may register with the IMS 130 via the network 120 and then maintain synchronization with the IMS 130. When the UE 110 is powered on or initiates a voice call, the UE 110 may connect with the network 120 and register with the IMS 130. The registration procedure may involve the UE 110 and the IMS 130 exchanging various parameters and capabilities of both entities, such as via an IMS data network name (DNN) packet data unit (PDU) session and proper responses. Not all blocks that are involved in the procedure for registration of the UE 110 with the IMS 130 are described for brevity. Once the UE 110 registers with the IMS 130, the UE 110 may maintain synchronization therewith. As used herein, the term synchronization can refer to a state/scenario wherein the network has received the UE IMS registered status. There may also be a periodic IMS re-registration time that requires a UE to synchronize with the network.

In some instances, the UE 110 may lose synchronization with the IMS 130. The loss of synchronization may result in the UE 110 not being able to receive incoming calls or send outgoing calls, there is a network malfunction, or the UE may have some issue, e.g., the UE cannot finish it's re-registration process. The UE 110 can automatically identify the loss of synchronization when making outgoing calls and, thus, take actions to remedy the connectivity issue. However, the UE 110 may not be able to identify such issues when the UE 110 is idle and presumably ready to receive incoming calls. In fact, the UE 110 may not even be aware that the UE 110 is not receiving incoming calls. The discussion below, which assumes that the UE 110 is previously registered and synchronized with the IMS 130, provides details of identifying and rectifying connectivity issues.

As shown in FIG. 1, the system 100 shows the UE 110 attempting an outgoing voice call 123. However, because the UE 110 has lost synchronization with the IMS 130 or the network 120, the call fails, represented by the "X" before the outgoing voice call 123 reaches the network 120 and the IMS 130. In such instances, since the UE 110 is an originating point for the voice call 123, the connectivity handler 111 (or other application of the UE 110) may present the user with an error or other notification that the call did not connect and that there is a connectivity issue. The user or the UE 110 may then take one or more blocks to correct the connectivity issue.

On the other hand, in the case of an incoming call, the network 120 may route an incoming voice call 122, for example, from the IMS 130 to the UE 110. The incoming voice call 122 may originate at an originating device (not shown) and be routed via the IMS 130 and the network 120 to terminate at the UE 110, which is a terminating device for the incoming voice call 122. However, the UE 110, because of loss of synchronization, etc., with the IMS 130, is unable to receive the incoming voice call 122. Thus, the incoming voice call 122 does not reach the UE 110 and is directed instead to the user's voicemail at the voicemail server 150. Should the incoming voice call 122 result in a voicemail, the voicemail server 150, or similar component, may generate a voicemail notification 142 to notify the UE 110 that a new voicemail is available for review. In some embodiments, the voicemail server 150 sends the voicemail notification 142 to the UE 110 via SMS or some other non-IMS communication. In this way, the UE 110 may receive the voicemail notification 142 (e.g., the non-IMS communication) while unable to receive the incoming voice call 122 (e.g., the IMS communication). This may occur when the UE 110 maintains a connection with the network 120 that maintains SMS communications but loses registration or synchronization with the IMS 130. In such an embodiment where the UE 110 receives the voicemail notification 142 but does not receive the incoming voice call 122, the UE 110 may indicate (or otherwise identify) that there is one awaiting voicemail via a notification 104 but zero missed calls via notification 104.

In some aspects of the embodiments described herein, the connectivity handler 111 uses the voicemail notification 142 as a trigger to determine whether the UE 110 is experiencing a connectivity issue with the IMS 130.

No Connectivity Issue

The connectivity handler 111 may determine that there is no connectivity issue when the voicemail notification 142 is received within a preset time of an incoming voice call that is received at the UE 110. For example, upon receipt of the voicemail notification 142, the connectivity handler 111 may determine whether the incoming voice call was received and not answered at the UE 110 within the preset time of, for example, three minutes before receipt of the voicemail notification 142. Where the UE 110 did receive but did not answer the incoming voice call, the connectivity handler 111 may determine that the received voicemail notification 142 is related to the unanswered incoming call and further determine that no connectivity issue exists.

Similarly, the connectivity handler 111 may determine that there is no connectivity issue when the UE 110 receives the voicemail notification 142 while the UE 110 is in a "call forwarding", "do not disturb", or similar "call handling mode". Such call handling modes may not trigger a "missed call" notification to the user but also may not cause the UE 110 to "ring" or otherwise notify the user of an active incoming voice call or present the user with an option to answer the active incoming voice call. For example, upon receipt of the voicemail notification 142, the connectivity handler 111 may determine whether the UE 110 is in or was in the call handling mode within a preset time of, for example, three minutes, of receipt of the voicemail notification 142. Where the UE 110 received an incoming voice call during the call handling mode, the connectivity handler 111 may determine that the received voicemail notification 142 is related to the incoming voice call received during the call handling mode and further determine that no connectivity issue exists.

Connectivity Issue

However, the connectivity handler 111 may determine that there is a connectivity issue when the voicemail notification 142 is received but no incoming voice call is received within the preset time and the UE 110 is not in any call handling mode. For example, upon receipt of the voicemail notification 142, the connectivity handler 111 may determine whether a corresponding incoming voice call was received and not answered at the UE 110 or whether the UE 110 is or was in a call handling mode within the preset time before receipt of the voicemail notification 142. Where the UE 110 did not receive the incoming voice call and the UE was not in the call handling mode, the connectivity handler 111 may determine that the connectivity issue exists. Thus, the connectivity handler 111 identifies the connectivity issue between the UE 110 and the IMS 130 exists based on: (1) receipt of the voicemail notification 142, (2) identification that the UE 110 did not receive the incoming voice call 122 within a preset time before receipt of the voicemail notification 142; and (3) determination that the UE 110 was not in one of the described call handling modes within the preset time.

Upon determination that the connectivity issues exist, the connectivity handler 111 may provide a notification to the user via the UE 110 and may perform various procedures to identify and remedy the connectivity issue, in accordance with the disclosed embodiments. Further details are described in reference to FIG. 2-FIG. 4.

Figure 2:
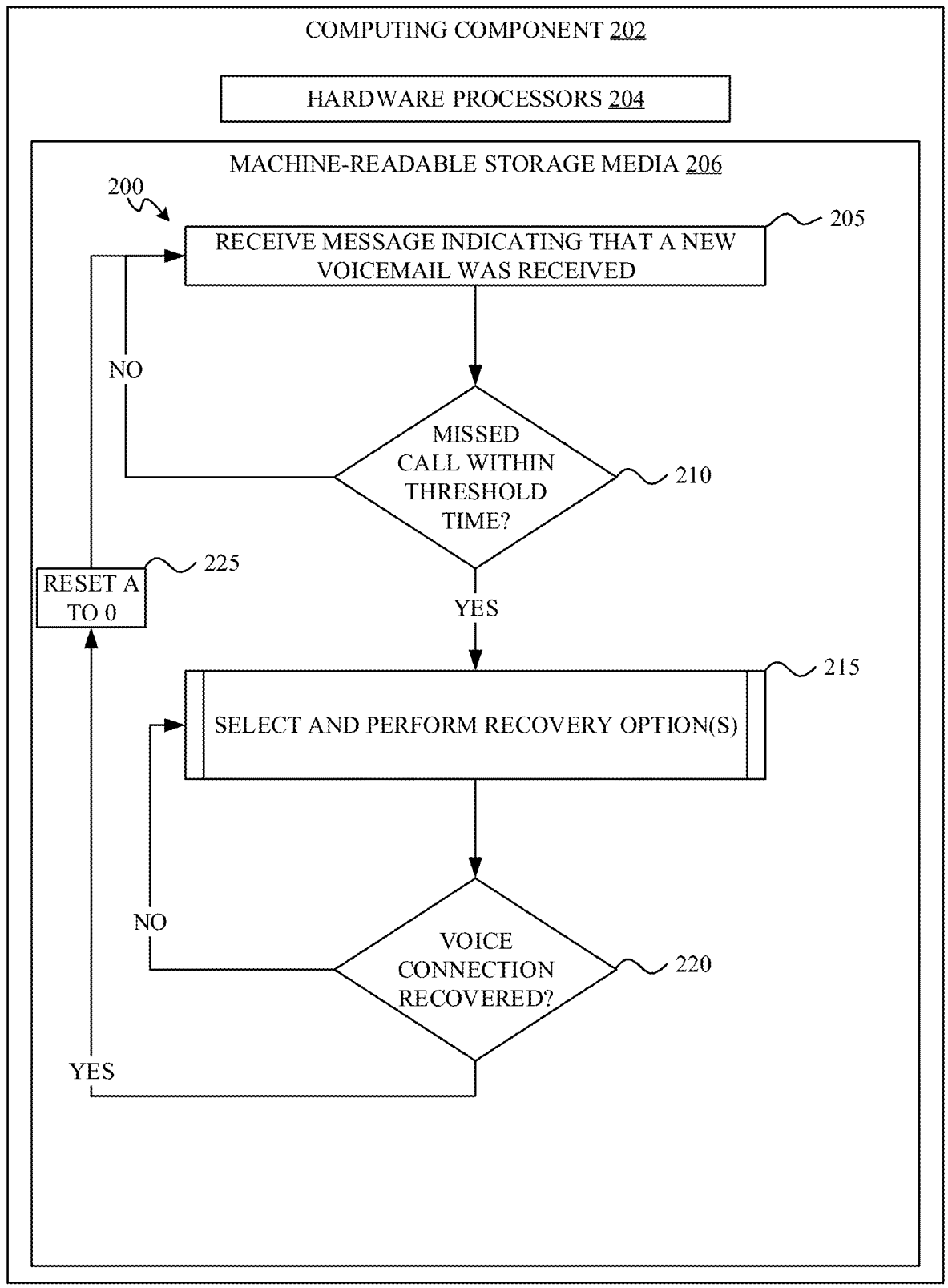
FIG. 2 is an operational flow diagram illustrating an example computing device of the computing system of FIG. 1 configured to identify a connectivity issue and select and perform recovery option(s) to correct the connectivity issue, in accordance with some embodiments.

FIG. 2 is an example computing device of the computing system of FIG. 1 configured to identify a connectivity issue and select and perform recovery option(s) to correct the connectivity issue, pursuant to an operational flow diagram and in accordance with some embodiments. As seen in FIG. 2, a process 200 is illustrated as a series of executable operations stored in a machine-readable storage media 206 and performed by a hardware processor 204 of a computing component 202. The computing component 202 can be a computing device used for telecommunication functions, such as the UE 110. In some embodiments, the connectivity handler 111 of the UE 110 implements the process 200 to determine whether the UE 110 is experiencing a connectivity issue with the IMS 130 and perform recovery blocks to rectify the issue. While the discussion below describes the connectivity handler 111 performing the respective operations, any other component of the UE 110 may perform any operation below instead or as well.

The process 200 begins at operation 205, where the UE 110 receives a message indicating that the UE 110 missed an incoming voice call or other incoming multimedia voice message. For example, the UE 110 receives the message via a non-IMS message or signaling, such as via SMS messaging. In some embodiments, the message comprises a voicemail notification indicating that a new voicemail is available for review. In some embodiments, the message is an SMS message received from another user indicating that the other used attempted to call the user or another notification that indicates that someone attempted to contact the user via the UE 110. The connectivity handler 111 may review the message or notification to determine whether the received message indicates that the UE 110 missed an incoming communication, such as an incoming voice call.

At operation 210, the connectivity handler 111 may determine whether the UE 110 registered a missed call or communication attempt within a preset time before receiving the message of operation 205. In some embodiments, the preset time comprises a number of seconds, minutes, or so forth. The preset time may represent an expected amount of time before the message received at operation 205 within which the UE 110 would have received an incoming communication corresponding to the received message. For example, when the message received at operation 205 indicates anew voicemail is available, the preset time may correspond to a number of minutes within which if the UE 110 missed an incoming call, the UE 110 would receive the voicemail message. In some embodiments, the determination whether the UE 110 registered a missed call or communication attempt within the preset time before receiving the message comprises determining whether the UE 110 was in a call handling mode, as introduced above.

At operation 210, when the connectivity handler 111 determines that the UE 110 did not miss the incoming voice call, the process 200 repeats from operation 205 until the connectivity handler 111 determines that the UE 110 did miss the incoming voice call. On the other hand, when the connectivity handler 111 determines that the UE 110 did miss the incoming voice call, the process 200 continues to operation 215.

At operation 215, the connectivity handler 111 selects a recovery option or block(s) to perform to recover from the connectivity issue. Depending on various conditions of the UE 110, the connectivity handler 111 may select one or more recovery options to perform in a sequential order or in parallel with each other. Details of the recovery option selection and performance are provided below with reference to FIGS. 3A and 3B.

At operation 220, after the connectivity handler 111 selects and performs one or more recovery options at operation 215, the connectivity handler 111 determines whether the voice connection for the UE 110 with the network 120 has recovered or been restored. In some embodiments, this operation is optional and the connectivity handler 111 and the UE 110 assumes that the recovery option(s) successfully remedied the connectivity issue between the UE 110 and the IMS 130. In some embodiments, the connectivity handler 111 may determine that the voice connection for the UE 110 has been restored by making an outgoing call, performing connectivity checks with the IMS 130, receiving a connectivity verification communication from the IMS 130, or the like. In response to determining that the voice connection between the UE 110 and the IMS 130 has been recovered, the process 200 may restart the process 200 at operation 205 and monitor for new or subsequent connectivity issues. In some embodiments, restarting the process 200 involves the connectivity handler 111 resetting a counter variable A to zero at operation 225. In response to determining that the voice connection between the UE 110 and the IMS 130 has not been recovered, the connectivity handler 111 may repeat selection and performance of one or more additional recovery options at operation 215.

Figure 3A:
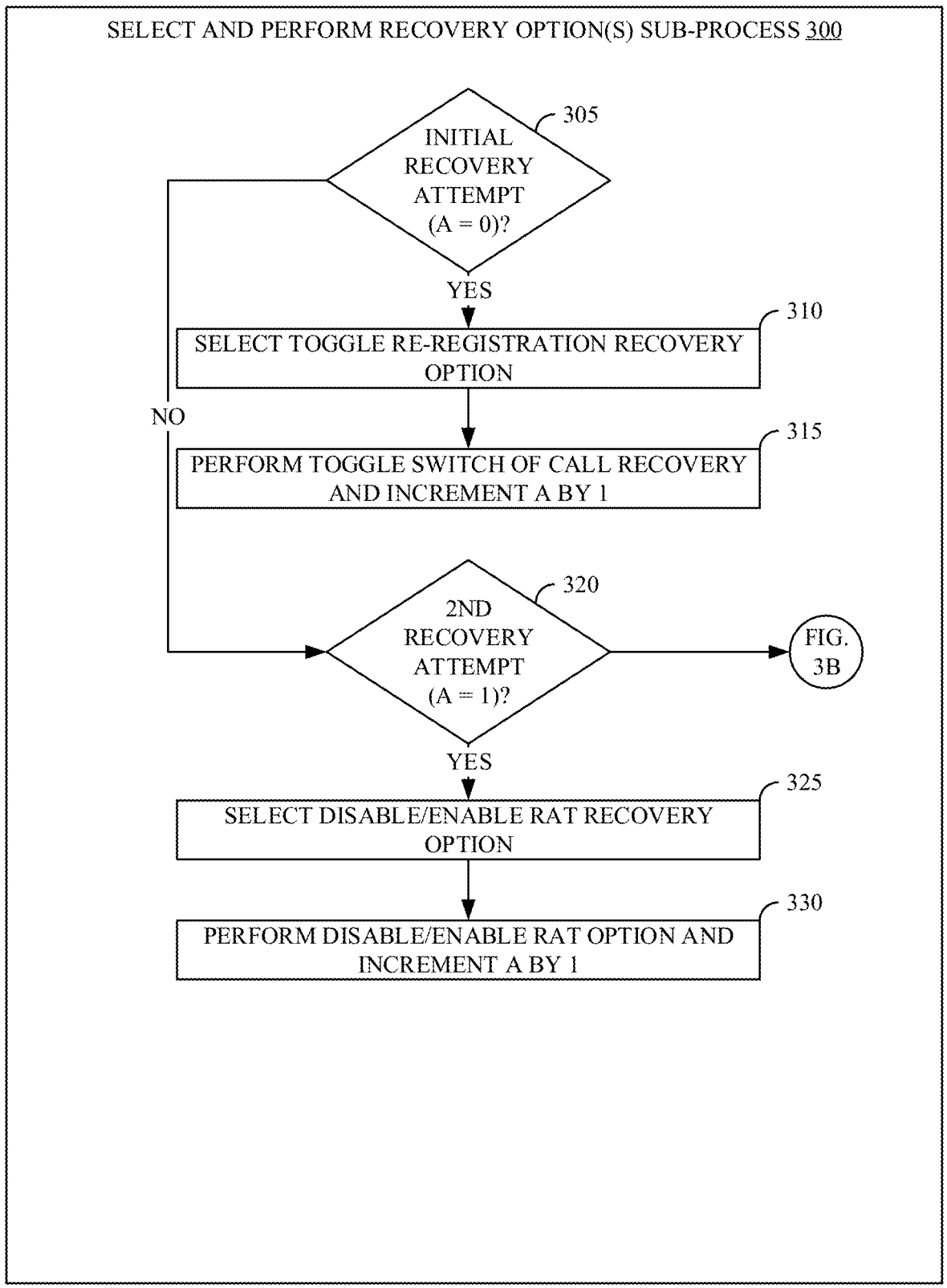
FIGS. 3A and 3B are an operational flow diagram illustrating details of selecting and performing recovery options following identification of a connectivity issue in the operational flow diagram of FIG. 2, in accordance with some embodiments.
Figure 3B:
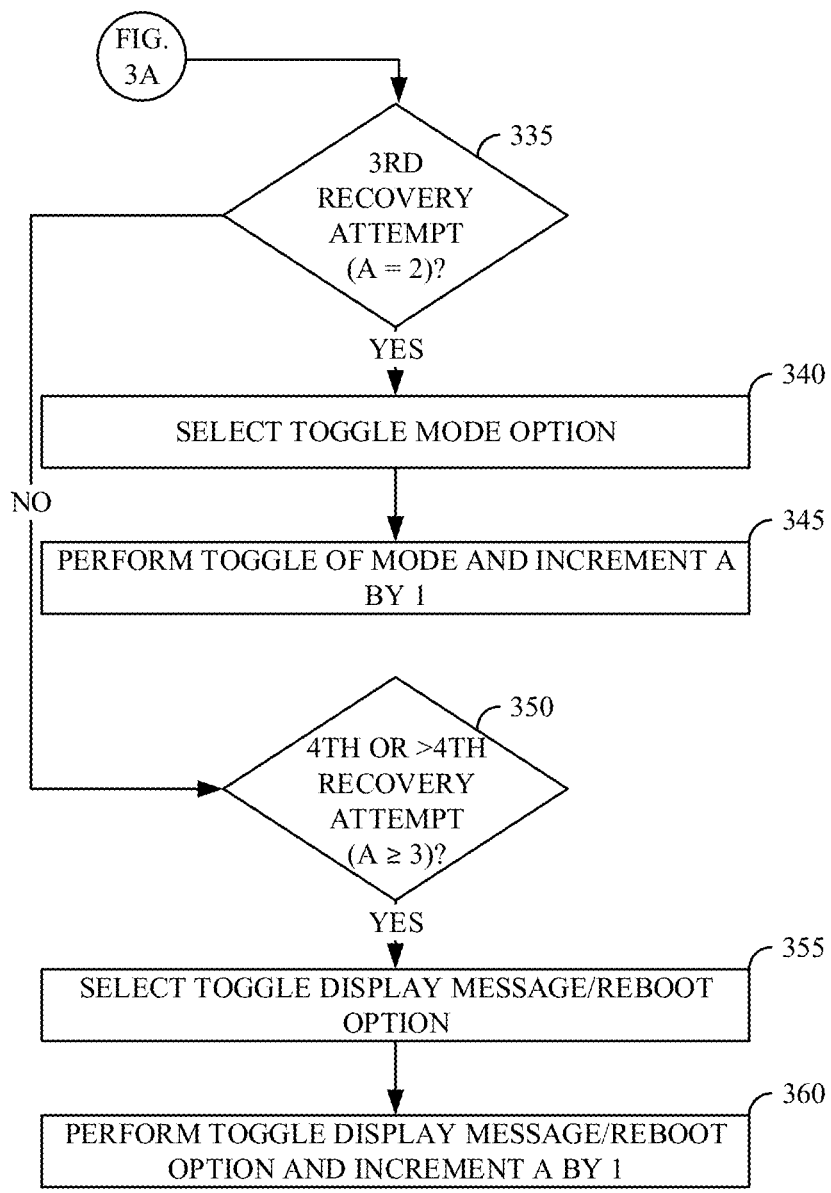

As introduced above, FIGS. 3A and 3B provide details regarding a subprocess 300 corresponding to the recovery option selection and performance of operation 215 of the process 200 of FIG. 2, in accordance with some embodiments. The subprocess 300 as shown includes four different possible actions to perform to recover the voice connection with the IMS network following identification of the connectivity issue by operation 210.

The subprocess 300 begins with the connectivity handler 111 performing operation 305. At operation 305, the connectivity handler 111 determines whether it is selecting and performing a first recovery attempt for the connectivity issue (i.e., whether this is the first execution of the subprocess 300 for the connectivity issue). When the connectivity handler 111 determines that this is an initial recovery attempt, the connectivity handler 111 executes operation 310. When the connectivity handler 111 determines that this is not the initial recovery attempt, the connectivity handler 111 instead executes operation 320 (described below). In some embodiments, the connectivity handler 111 identifies an initial recovery attempt based on the counter variable A or some other tracking means. For example, when the counter variable A is equal to "0", the connectivity handler 111 determines that this is the initial recovery attempt for the connectivity issue at operation 305. On the other hand, when the counter variable A is greater than "0", the connectivity handler 111 determines that this is not the initial recovery attempt for the connectivity issue.

At operation 310, the connectivity handler 111 selects a first recovery option. Specifically, the connectivity handler 111 may select to toggle a re-registration option at operation 310. The connectivity handler 111 may execute the re-registration option at operation 315. By toggling (i.e., selecting and executing) the re-registration (also referred to as a switch of call over IMS), the connectivity handler 111 may re-start IMS registration between the UE 110 and the IMS 130. In some embodiments, the re-registration procedure re-establishes synchronization between the UE 110 and the IMS 130 and enables receipt of incoming voice calls. In certain circumstances, the re-registration procedure may be sufficient remedial action by the connectivity handler 111 to recover the UE 110 from the connectivity issue. Furthermore, at operation 315, the connectivity handler 111 may increment the counter variable A by 1 to log the first recovery attempt by the connectivity handler 111. Thereafter, the connectivity handler 111 can terminate the subprocess 300 and proceed to operation 220 according to the process 200 of FIG. 2.

At operation 320, the connectivity handler 111 determines whether it is selecting and performing a second recovery attempt for the connectivity issue (i.e., whether this is the second execution of the subprocess 300 for the connectivity issue). When the connectivity handler 111 determines that this is a second recovery attempt, the connectivity handler 111 executes operation 325. When the connectivity handler 111 determines that this is not the second recovery attempt, the connectivity handler 111 instead executes operation 335.

In some embodiments, the connectivity handler 111 identifies the second recovery attempt based on the counter variable A or some other tracking means. For example, when the variable counter A is equal to "1", the connectivity handler 111 determines that this is the second recovery attempt for the connectivity issue at operation 320. On the other hand, when the counter variable A is greater than "1", the connectivity handler 111 determines that this is not the second recovery attempt for the connectivity issue.

At operation 325, the connectivity handler 111 selects a second recovery option. Specifically, the connectivity handler 111 may select to toggle a RAT by which the UE 110 is communicating with the IMS 130 at operation 325 and execute the RAT toggling at operation 330. By toggling the RAT, the connectivity handler 111 may disable a corresponding radio (e.g., the 2G/3G, 4G, 4G LTE, 5G, Wi-Fi, or other radio) over which the UE 110 was previously registered with the IMS 130 and then re-enable that radio. In some embodiments, this disabling and re-enabling of the RAT may result in re-registering or synchronizing the UE 110 with the IMS 130 and, thus, enabling receipt of incoming voice calls at the UE 110. In some embodiments, disabling the corresponding radio may also help clear any errors (software and/or hardware) in the radio that could cause the connectivity issue. Thus, in certain circumstances, the disabling and re-enabling of the RAT may be sufficient remedial action by the connectivity handler 111 to recover the UE 110 from the connectivity issue where simply toggling re-registration at operation 310 was insufficient. Furthermore, at operation 330, the connectivity handler 111 may increment the counter variable A by 1 to log the second recovery attempt by the connectivity handler 111. Thereafter, the connectivity handler 111 can terminate the subprocess 300 and proceed to operation 220 according to the process 200 of FIG. 2.

On the other hand, at operation 335, the connectivity handler 111 determines whether it is selecting and performing a third recovery attempt for the connectivity issue (i.e., whether this is the third execution of the subprocess 300 for the connectivity issue). When the connectivity handler 111 determines that this is the third recovery attempt, the connectivity handler 111 executes operation 340. When the connectivity handler 111 determines that this is not the third recovery attempt, the connectivity handler 111 instead executes operation 350.

In some embodiments, the connectivity handler 111 identifies the third recovery attempt based on the counter variable A or some other tracking means. For example, when the counter variable A is equal to "2", the connectivity handler 111 determines that this is the third recovery attempt for the connectivity issue at operation 335. On the other hand, when the counter variable A is greater than 2, the connectivity handler 111 determines that this is not the third recovery attempt for the connectivity issue.

At operation 340, the connectivity handler 111 selects a third recovery option. Specifically, the connectivity handler 111 may select to toggle an airplane or similar mode for the UE 110 and execute the toggling of the airplane or similar mode at operation 345. By toggling the airplane mode, the connectivity handler 111 may cause de-registration of the UE 110 from the IMS 130. Toggling airplane mode may also disable all radios of the UE 110, which may result in a cleaning up and resetting of any erroneous states at the UE 110 with respect to the IMS 130. After de-registering the UE 110 from the IMS 130, the connectivity handler 111 may perform a fresh registration of the UE 110 with the IMS 130. In some embodiments, this toggling of the airplane (or similar) mode may result in additional software and/or hardware changes in the UE 110 that in turn result in re-registering or synchronizing the UE 110 with the IMS 130 when airplane mode is disabled. Thus, in certain circumstances, the toggling of airplane mode for the UE 110 may be sufficient remedial action by the connectivity handler 111 to recover the UE 110 from the connectivity issue where toggling re-registration at operation 310 and disabling and re-enabling the RAT at operation 325 were insufficient. Furthermore, at operation 345, the connectivity handler 111 may increment the counter variable A by 1 to log the third recovery attempt by the connectivity handler 111. Thereafter, the connectivity handler 111 can terminate the subprocess 300 and proceed to operation 220 according to the process 200 of FIG. 2.

At operation 350, the connectivity handler 111 determines whether it is selecting and performing a fourth (or greater) recovery attempt for the connectivity issue (i.e., whether this is the fourth or greater execution of the subprocess 300 for the connectivity issue). When the connectivity handler 111 determines that this is the fourth or greater recovery attempt, the connectivity handler 111 executes operation 355.

In some embodiments, the connectivity handler 111 identifies the fourth or greater recovery attempt based on the counter variable A or some other tracking means. For example, when the counter variable A is equal to or greater than 3, the connectivity handler 111 determines that this is the fourth or greater recovery attempt for the connectivity issue at operation 350.

At operation 355, the connectivity handler 111 selects a fourth recovery option. Specifically, the connectivity handler 111 may select to toggle a display of a message to the user and a reboot of the UE 110 and execute the messaging and reboot of the UE 110 at operation 360. By toggling the message and reboot, the connectivity handler 111 may ensure that the user is aware of a reason of the reboot of the UE 110 (because unexpected and unexplained reboots of the UE 110 can disrupt the user experience with the UE 110). The reboot of the UE 110 may result in a more thorough cleaning up and resetting of erroneous states, etc., at the UE 110 with respect to the IMS 130 as compared to any other action at the UE 110. After rebooting the UE 110, the connectivity handler 111 may perform a fresh registration of the UE 110 with the IMS 130. In certain circumstances, the reboot of the UE 110 may be sufficient remedial action by the connectivity handler 111 to recover the UE 110 from the connectivity issue where toggling re-registration at operation 310, disabling and re-enabling the RAT at operation 325, and enabling/disabling airplane mode at operation 340 were insufficient. Furthermore, at operation 360, the connectivity handler 111 may increment the counter A by "1" to log the fourth recovery attempt by the connectivity handler 111. Thereafter, the connectivity handler 111 can terminate the subprocess 300 and proceed to operation 220 according to the process 200 of FIG. 2. In some embodiments, the reboot of the UE 110 according to operation 360 is automated without user input. In some other embodiments, the UE 110 may prompt the user to reboot the UE 110.

Figure 4:
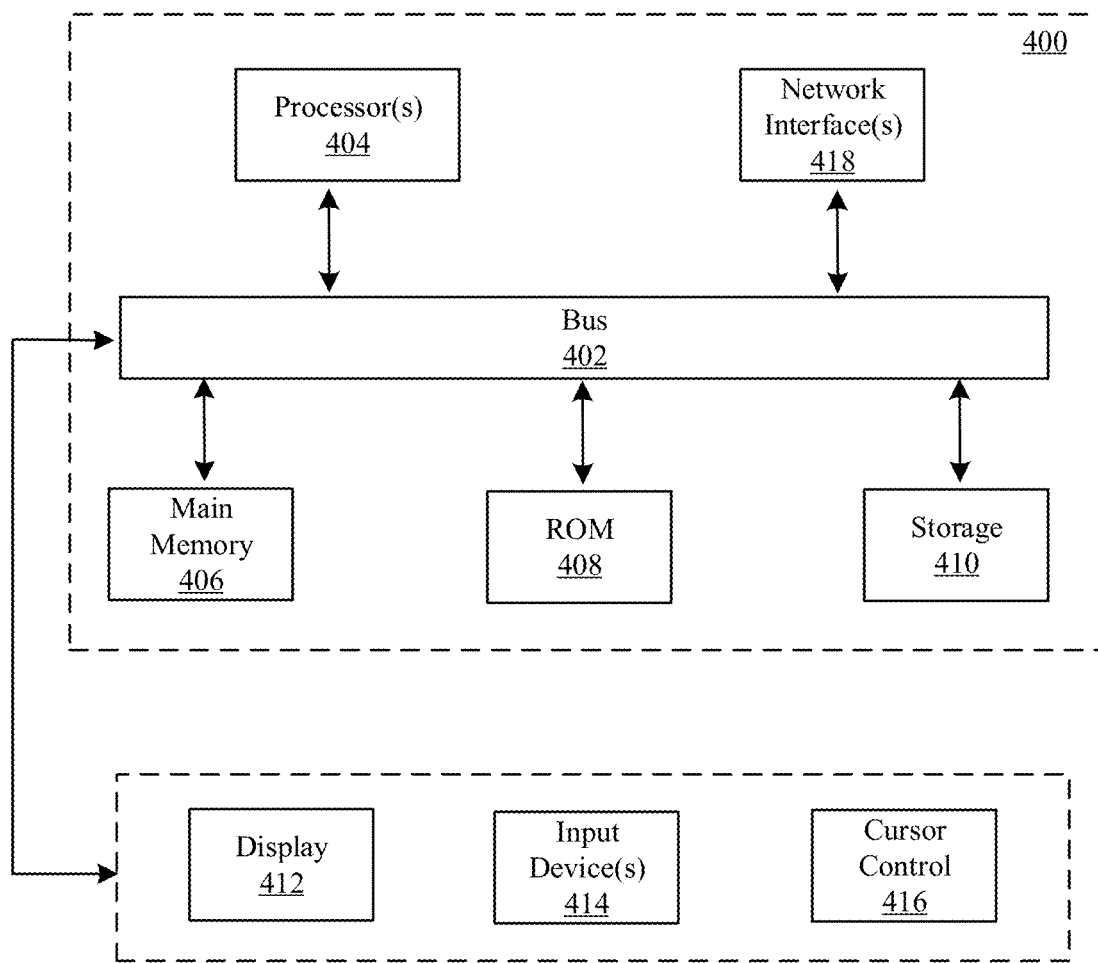
FIG. 4 is a block diagram of an example computing component or device for implementing the disclosed techniques, in accordance with some embodiments.

FIG. 4 depicts a block diagram of an example computer system 400 in which various features described herein may be implemented. The computer system 400 includes a bus 402 or other communication mechanisms for communicating information, one or more hardware processors 404 coupled with bus 402 for processing information. Hardware processor(s) 404 may be, for example, one or more general purpose microprocessors.

The computer system 400 also includes a main memory 406, such as a random-access memory (RAM), cache and/or other dynamic storage devices, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

The computer system 400 further includes a read only memory (ROM) 408 or other static storage device coupled to bus 402 for storing static information and instructions for processor 404. A storage device 410, such as a magnetic disk, optical disk, or USB thumb drive (Flash drive), etc., is provided and coupled to bus 402 for storing information and instructions.

The computer system 400 may be coupled via bus 402 to a display 412, such as a liquid crystal display (LCD) (or touch screen), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. In some embodiments, the same direction information and command selections as cursor control may be implemented via receiving touches on a touch screen without a cursor.

The computer system 400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," "data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor(s) 404 executing one or more sequences of one or more instructions contained in main memory 406. Such instructions may be read into main memory 406 from another storage medium, such as storage device 410. Execution of the sequences of instructions contained in main memory 406 causes processor(s) 404 to perform the process blocks described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 410. Volatile media includes dynamic memory, such as main memory 406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 402. Transmission media can also take the form of acoustic or light waves, such as those generated during radio-wave and infra-red data communications.

The computer system 400 also includes a communication interface 418 coupled to bus 402. Communication interface 418 provides a two-way data communication coupling to one or more network links that are connected to one or more local networks. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN (or WAN component to communicated with a WAN). Wireless links may also be implemented. In any such implementation, communication interface 418 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 418, which carry the digital data to and from computer system 400, are example forms of transmission media.

The computer system 400 can send messages and receive data, including program code, through the network(s), network link and communication interface 418. In the Internet example, a server might transmit a requested code for an application program through the Internet, the ISP, the local network and the communication interface 418.

The received code may be executed by processor 404 as it is received, and/or stored in storage device 410, or other non-volatile storage for later execution.

Figure 5:
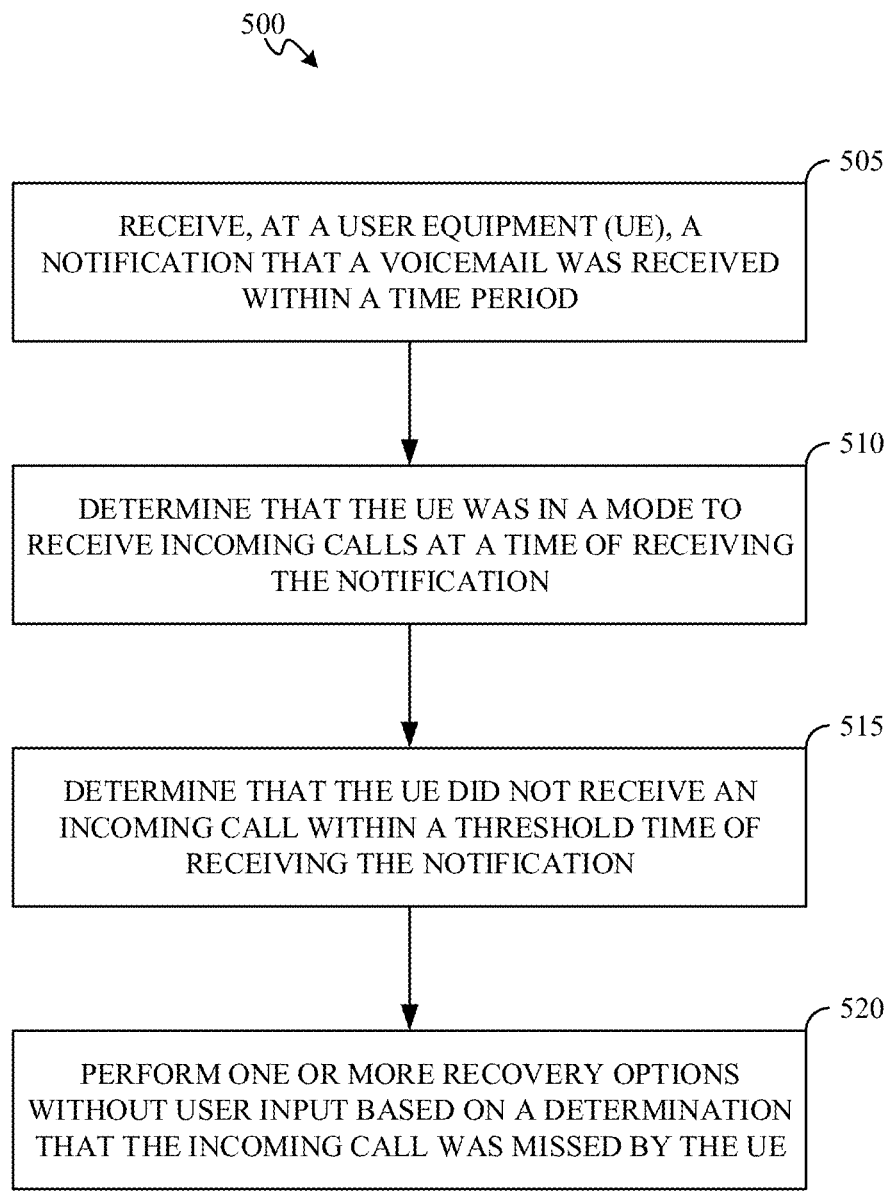
FIG. 5 is a flow diagram illustrating a method of detecting and recovering from a connectivity issue, in accordance with some embodiments.

FIG. 5 is a flow diagram illustrating a method 500 of detecting and recovering from a connectivity issue comprising example blocks that can be performed by one or more components of the UE 110, such as a processor or other hardware or software component. For example, the processor 404 can fetch, decode, and/or execute one or more instructions for performing various blocks of the method 500. Various instructions (e.g., for performing one or more blocks described herein) can be stored in non-transitory storage medium and/or corresponding control logic circuitry, where the term "non-transitory" does not encompass transitory propagating signals. "Non-transitory" as used herein refers to any media that store data and/or instructions that cause a machine to operate in a specific fashion. Such non-transitory media may comprise non-volatile media and/or volatile media. Non-volatile media includes, for example, optical or magnetic disks. Volatile media includes dynamic memory. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same. As described in detail below, machine-readable storage medium of the main memory 406, the ROM 408, and/or the storage device 410 may be encoded with executable instructions, for example, instructions for executing blocks of the method 500. Non-transitory media is distinct from but may be used in conjunction with transmission media. Transmission media participates in transferring information between non-transitory media. For example, transmission media includes coaxial cables, copper wire and fiber optics, including the wires that comprise the bus 402 between the processor 404 and other components of the computer system 400. Transmission media can also take the form of acoustic or light waves, such as those generated during radio-wave and infra-red data communications.

The method 500 may comprise a method of detecting a missed call and recovering from corresponding connectivity issues in a UE 110. Operations that make up the method 500 may be performed by one or more UEs or a centralized computing system or server. For example, the operations of the method 500 are described as being performed by the UE 110.

A block 505 of the method 500 comprises receiving, at a UE such as the UE 110, a notification that indicates that the UE missed an incoming voice call. As introduced above, the notification can comprise a voicemail or similar notification. In some embodiments, the notification is associated with a preset period that comprises a number of seconds or a number of minutes, and so forth.

At block 510, the method 500 comprises determining that the UE was in a mode to receive incoming calls within the preset period of when the UE received the notification. This means that the UE was not in one of the call handling modes described above during the preset period.

At block 515, the UE determines that the UE did not receive the incoming call within the preset time. As described above, such a determination means that there is a connectivity issue between the UE and the IMS.

At block 520, the UE selects and performs one or more recovery options. The selection and performance may be performed automatically based on a determination that the incoming call was missed by the UE. The one or more recovery options may comprise various selections, as described above.

In some embodiments, while the method 500 is described as being performed by the UE, it will be understood that the corresponding operations can be performed by a network controller or other controller device communicating via the network 120. Furthermore, in some embodiments, the network controller may monitor communications or attempted communications (for example, the incoming voice call 122 and the voicemail notification 142) that occur via the network 120. In some embodiments, the network controller is a cloud-based computing system.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 400.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or blocks.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A user equipment (UE), comprising:
  a first communication circuit configured to receive a notification via a Short Messaging Service (SMS) message;
  a processor; and
  a memory unit operatively connected to the processor and including instructions that, when executed, cause the processor to:
    determine that the notification indicates that an incoming call was directed to the UE via an Internet Protocol (IP) Multimedia Subsystem (IMS) service during a preset time period immediately before a time at which the notification is received;
    in response to the determination of the notification, determine that the UE is experiencing a connectivity issue with the IMS which caused the UE to miss the incoming call during the preset time period, upon identifying at least one of:
      identifying that the incoming call was not forwarded to another device during the preset time period; or
      identifying that, during the preset time period, the UE was not in a call handling mode in which mode the UE is caused not to ring or otherwise notify a user of an active incoming voice call or present the user with an option to answer the active incoming voice call; and based on determination that the UE is experiencing the connectivity issue with the IMS, correct the connectivity issue with the IMS by performing a recovery option;

wherein the instructions to perform a recovery option comprise instructions that cause the processor to synchronize communications between the IMS and the UE; and wherein the instructions that cause the processor to perform the recovery option comprise instructions that cause the processor to:

in response to determining that it is an initial recovery attempt to recover from the connectivity issue with the IMS, restart a registration process between the IMS and the UE, and re-establish a voice call capability for the UE with the IMS following the restart of the registration process;

in response to determining that the initial recovery attempt failed to recover from the connectivity issue with the IMS and it is a second recovery attempt to recover from the connectivity issue with the IMS, successively disable and re-enable a second communication circuit of the UE via which voice calls are routed, and re-establish the voice call capability for the UE with the IMS via the second communication circuit following the re-enabling of the second communication circuit;

in response to determining that the second recovery attempt failed to recover from the connectivity issue with the IMS and it is a third recovery attempt to recover from the connectivity issue with the IMS, successively disable and re-enable all communication circuits of the UE, and re-establish the voice call capability for the UE with the IMS following the re-enabling of all communication circuits of the UE; and in response to determining that the third recovery attempt failed to recover from the connectivity issue with the IMS and it is a fourth recovery attempt to recover from the connectivity issue with the IMS, reboot the UE, and re-establish the voice call capability for the UE with the IMS following the rebooting of the UE.

2. The UE of claim 1, wherein the instructions further cause the processor to generate an indicator to the user of the UE indicating that the UE is experiencing the connectivity issue with the IMS based on the identification that the UE did not receive the incoming call.

3. A computer implemented method, comprising:

receiving a notification at a user equipment (UE) via a first communication circuit, wherein the notification is received via a Short Messaging Service (SMS) message and the UE receives incoming calls via an Internet Protocol (IP) Multimedia Subsystem (IMS) service;

determining that the notification indicates that an incoming call was directed to the UE via the IMS service during a preset time period immediately before a time at which the notification is received;

in response to the determination of the notification, determining that the UE is experiencing a connectivity issue with the IMS which caused the UE to be failed to receive the incoming call during the preset time period, upon at least one of:

identifying that the incoming call was not forwarded to another device during the preset time period; or identifying that, during the preset time period, the UE was not in a call handling mode in which mode the UE is caused not to ring or otherwise notify a user of an active incoming voice call or present the user with an option to answer the active incoming voice call; and based on determination that the UE is experiencing the connectivity issue with the IMS, correcting the connectivity issue with the IMS by performing a recovery option comprising:

synchronizing voice communications between the UE and the IMS via which the incoming call is received by the UE;

wherein performing the recovery option comprises:

in response to determining that it is an initial recovery attempt to recover from the connectivity issue with the IMS, restarting a registration process between the IMS and the UE, and re-establishing a voice call capability for the UE with the IMS following the restart of the registration process;

in response to determining that the initial recovery attempt failed to recover from the connectivity issue with the IMS and it is a second recovery attempt to recover from the connectivity issue with the IMS, successively disabling and re-enabling a second communication circuit of the UE via which voice calls are routed, and re-establishing the voice call capability for the UE with the IMS via the second communication circuit following the re-enabling of the second communication circuit;

in response to determining that the second recovery attempt failed to recover from the connectivity issue with the IMS and it is a third recovery attempt to recover from the connectivity issue with the IMS, successively disabling and re-enabling all communication circuits of the UE, and re-establishing the voice call capability for the UE with the IMS following the re-enabling of all communication circuits of the UE; and in response to determining that the third recovery attempt failed to recover from the connectivity issue with the IMS and it is a fourth recovery attempt to recover from the connectivity issue with the IMS, rebooting the UE, and re-establishing the voice call capability for the UE with the IMS following the rebooting of the UE.

4. The method of claim 3, further comprising: generating an indicator to the user of the UE indicating that the UE is experiencing the connectivity issue with the IMS based on the identification that the UE did not receive the incoming call.

5. A communication apparatus, comprising:

a processor; and a memory unit operatively connected to the processor and including instructions that, when executed, cause the processor to:

upon receipt of a notification, by a user equipment (UE), indicating that a voicemail message for the UE was received within a given time period, determine that the UE was in a mode to receive incoming calls at a time during which the notification was received, wherein the UE receives the notification via a Short Messaging Service (SMS) message and the UE receives incoming calls via an Internet Protocol (IP) Multimedia Subsystem (IMS) service;

determine that the UE is experiencing a connectivity issue with the IMS which caused the UE to miss an incoming call within a preset time period immediately before a time of receiving the notification, upon identifying at least one of:
- identifying that the incoming call was not forwarded to another device during the preset time period; or
- identifying that, during the preset time period, the UE was not in a call handling mode in which mode the UE is caused not to ring or otherwise notify a user of an active incoming voice call or present the user with an option to answer the active incoming voice call; and based on determination that the UE is experiencing the connectivity issue with the IMS, correct the connectivity issue with the IMS by performing one or more recovery options without user input;

wherein the instructions to perform the one or more recovery options further cause the processor to synchronize communications between the IMS and the UE; and wherein the instructions that cause the processor to perform the recovery option comprise instructions that cause the processor to:
- in response to determining that it is an initial recovery attempt to recover from the connectivity issue with the IMS, restart a registration process between the IMS and the UE, and re-establish a voice call capability for the UE with the IMS following the restart of the registration process;
- in response to determining that the initial recovery attempt failed to recover from the connectivity issue with the IMS and it is a second recovery attempt to recover from the connectivity issue with the IMS, successively disable and re-enable a second communication circuit of the UE via which voice calls are routed, and re-establish the voice call capability for the UE with the IMS via the second communication circuit following the re-enabling of the second communication circuit;
- in response to determining that the second recovery attempt failed to recover from the connectivity issue with the IMS and it is a third recovery attempt to recover from the connectivity issue with the IMS, successively disable and re-enable all communication circuits of the UE, and re-establish the voice call capability for the UE with the IMS following the re-enabling of all communication circuits of the UE; and
- in response to determining that the third recovery attempt failed to recover from the connectivity issue with the IMS and it is a fourth recovery attempt to recover from the connectivity issue with the IMS, reboot the UE, and re-establish the voice call capability for the UE with the IMS following the rebooting of the UE.

* * * * *